United States Patent
Jackson (10) Patent No.: US 8,811,382 B2
(45) Date of Patent: Aug. 19, 2014

(54) METHODS AND APPARATUS TO PROVIDE A CALL-ASSOCIATED CONTENT SERVICE

(75) Inventor: James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 237 days.

(21) Appl. No.: 13/307,974

(22) Filed: Nov. 30, 2011

(65) Prior Publication Data

US 2012/0076136 A1 Mar. 29, 2012

Related U.S. Application Data (63) Continuation of application No. 11/767,180, filed on Jun. 22, 2007, now Pat. No. 8,090,840.

(51) Int. Cl.
*H04L 12/66* (2006.01)

(52) U.S. Cl.
USPC .......................................... 370/352; 455/416

(58) Field of Classification Search
None
See application file for complete search history.

(56) References Cited

U.S. PATENT DOCUMENTS

| | | | |
|---|---|---|---|
| 6,801,604 B2 | 10/2004 | Maes et al. | |
| 6,847,618 B2 | 1/2005 | Laursen et al. | |
| 7,016,348 B2 | 3/2006 | Laursen et al. | |
| 7,209,475 B1 | 4/2007 | Shaffer et al. | |
| 7,664,490 B2 * | 2/2010 | Aaby et al. | 455/416 |
| 8,045,541 B2 * | 10/2011 | Nishida et al. | 370/352 |
| 2003/0051037 A1 | 3/2003 | Sundaram et al. | |
| 2005/0069102 A1 | 3/2005 | Chang | |
| 2005/0207432 A1 | 9/2005 | Velez-Rivera et al. | |
| 2006/0002403 A1 | 1/2006 | Bettis et al. | |
| 2006/0013201 A1 | 1/2006 | Bettis et al. | |
| 2006/0050686 A1 * | 3/2006 | Velez-Rivera et al. | 370/352 |
| 2006/0090166 A1 | 4/2006 | Dhara et al. | |
| 2006/0178130 A1 * | 8/2006 | Makrygiannis | 455/406 |
| 2006/0251225 A1 | 11/2006 | Gomez-Ortigoza | |
| 2007/0061397 A1 | 3/2007 | Gregorat et al. | |
| 2007/0064672 A1 | 3/2007 | Raghav et al. | |
| 2007/0064743 A1 | 3/2007 | Bettis et al. | |
| 2008/0137644 A1 * | 6/2008 | Reynolds et al. | 370/352 |

OTHER PUBLICATIONS

Linksys a Division of Cisco Systems, Inc., Linksys One, downloaded one Jun. 21, 2007, from http://www.linksys.com/servlet/Satellite?c=L_C1&childpagename=US%2FLayout&cid=1159381357247&pagename=Linksys%2FCommon%2FVisitorWrapper, (1 page).

Linksys a Division of Cisco Systems, Inc., Linksys.com Scheduled Maintenance, downloaded one Jun. 21, 2007, from http://www.linksys.com/servlet/Satellite?childpagename=US%2FLayout&packedargs=c%3DL_News_C2%26cid%3D1130279171990&pagename=Linksys%2FCommon%2FVisitorWrapper, (1 page).

* cited by examiner

*Primary Examiner* — Andrew Lai
*Assistant Examiner* — Leon Andrews
(74) *Attorney, Agent, or Firm* — Hanley, Flight & Zimmerman, LLC (57) ABSTRACT

An example method includes performing a telephone number database query at a call session control function server to obtain a first uniform resource identifier for a destination and to obtain a second uniform resource identifier for the destination, establishing a first communication session to the destination based on the first uniform resource identifier, and initiating a second communication session on behalf of a calling device to the destination based on the second uniform resource identifier, the destination to provide content associated with the first communication session via the second communication session.

28 Claims, 6 Drawing Sheets

| 310 | 315 | 320 | 325 |
|---|---|---|---|
| E.614 NUMBER | DEST. SIP URI | DEST. HTTP URI | MEDIATOR SIP URI |
|  |  |  |  |

METHODS AND APPARATUS TO PROVIDE A CALL-ASSOCIATED CONTENT SERVICE

RELATED APPLICATIONS

This patent arises from a continuation of U.S. patent application Ser. No. 11/767,180, filed Jun. 22, 2007 (now U.S. Pat. No. 8,090,840). The entirety of U.S. Pat. No. 8,090,840 is hereby incorporated by reference.

FIELD OF THE DISCLOSURE

This disclosure relates generally to voice over Internet protocol (VoIP) devices and, more particularly, to methods and apparatus to provide a call-associated content service to VoIP devices.

BACKGROUND

Many voice over Internet protocol (VoIP)-based devices (e.g., smart telephones, personal digital assistants, etc.) are presentation-capable and/or facilitate multimodal usage. For example, user can provide inputs via voice, dual-tone multiple-frequency (DTMF) inputs, buttons and/or on-screen menus, and/or can receive outputs via voice, video and/or on-screen displays. In one example, presentation-capable and/or multimodal use devices can be used to implement graphical assisted telephony user interfaces that may be used, for example, to improve the usage of telephony services by persons with disabilities.

DETAILED DESCRIPTION

Methods and apparatus to provide a call-associated content service to voice over Internet protocol (VoIP) devices are disclosed. A disclosed example method includes receiving a message comprising a uniform resource identifier (URI) and a call dialog parameter at a content mediator, the call dialog parameter associated with a first communication session between a voice over Internet protocol (VoIP) endpoint and a destination, establishing a second communication session from the mediator to the destination based on the URI and the call dialog parameter, receiving content associated with the first communication session via the second communication session, and providing the content to the VoIP endpoint.

Another disclosed example method includes performing a telephone number (ENUM) database query at a call session control function (CSCF) server to obtain a first uniform resource identifier (URI) for a destination and to obtain a second URI for the destination, the second URI to provide content associated with a communication session established to the first URI, establishing a first communication session to the destination based on the first URI, and initiating a second communication session on behalf of a calling device to the destination based on the second URI.

Yet another disclosed example method includes receiving a telephone number (ENUM) query request message for a destination at an ENUM server, identifying a first URI associated with the destination at the ENUM server, the first URI useable to establish a first communication session to the destination, and identifying a second URI associated with the destination at the ENUM server, the second URI representative of a server to provide content associated with a first communication session via a second communication session.

A disclosed example apparatus includes a session initiation protocol (SIP) interface to receive a message comprising a uniform resource identifier (URI) and a call dialog parameter, the call dialog parameter associated with a first communication session between a voice over Internet protocol (VoIP) endpoint and a destination, an associated content agent to establish a second communication session to the destination based on the URI and the call dialog parameter, and to receive content associated with the first communication session via the second communication session, and a hyper-text transfer protocol (HTTP) interface to provide the content to the VoIP endpoint.

Another disclosed example apparatus includes a telephone number (ENUM) interface to perform an ENUM database query to obtain a first uniform resource identifier (URI) for a destination and to obtain a second URI for the destination, the second URI to provide content associated with a communication session established to the first URI, protocol server logic to establish a first communication session to the destination based on the first URI, and an associated content handler to initiate a second communication session on behalf of a calling device to the destination based on the second URI.

In the interest of brevity and clarity, throughout the following disclosure references will be made to the example Internet protocol (IP) Multimedia subsystem (IMS) based voice over IP (VoIP) communication system of FIG. 1. Moreover, the following disclosure will be made using session initiation protocol (SIP) messages and/or SIP-based message exchanges. However, it should be understood that the methods and apparatus described herein to provide call-associated content services are applicable to other VoIP communication systems and/or networks (e.g., networks based on soft switches), VoIP devices, IMS devices, feature servers, tElephone NUMber mapping (ENUM) servers, border elements, access networks, IP networks, IMS networks and/or IMS communication systems, and/or other types of protocols, messages, and/or message exchanges.

Figure 1:
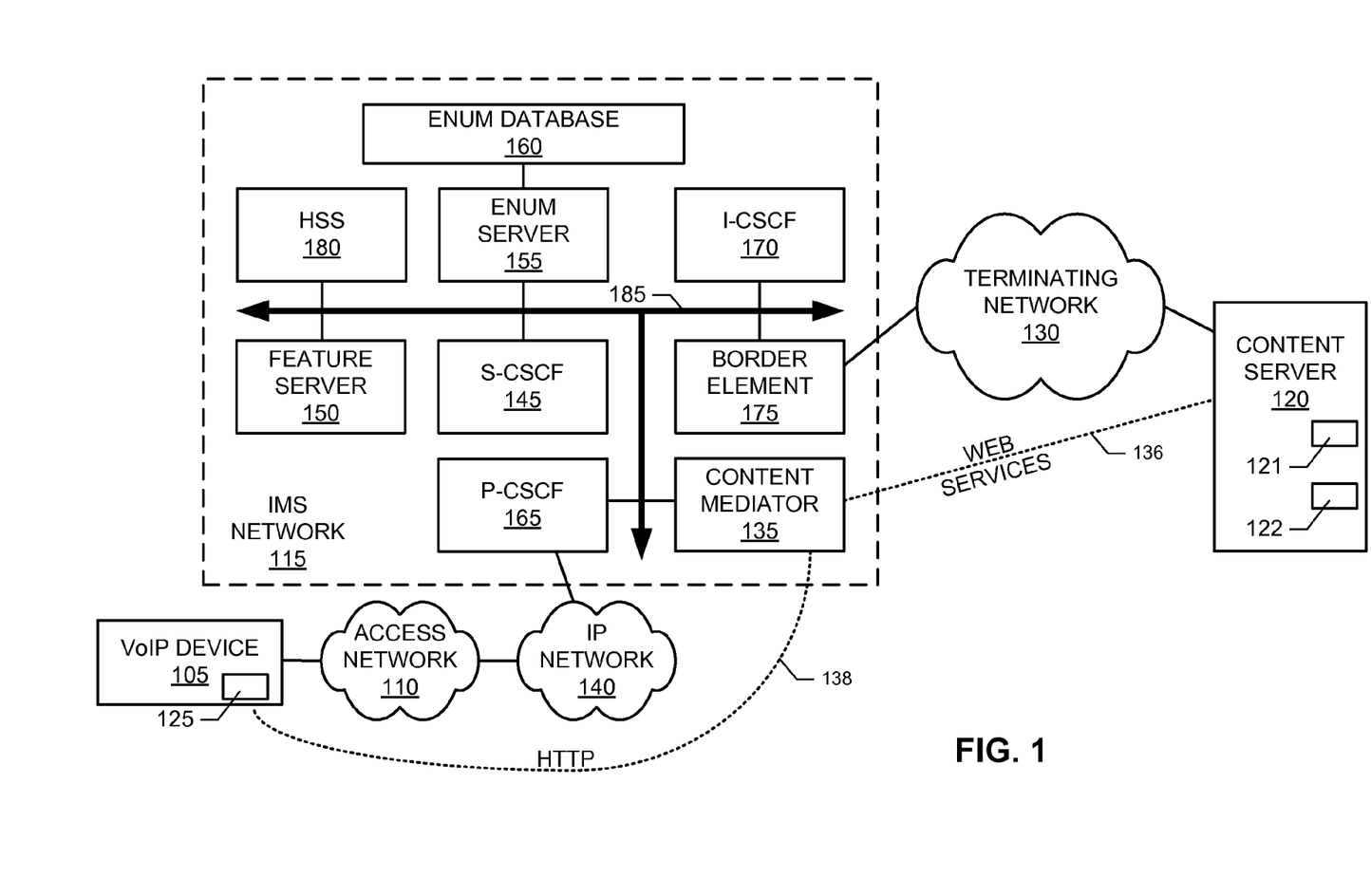
FIG. 1 is a schematic illustration of an example Internet Protocol (IP) Multimedia Subsystem (IMS) based voice over IP (VoIP) communication system constructed in accordance with the teachings of the invention.

FIG. 1 is a schematic illustration of an example IMS-based VoIP communication system that includes any number and/or type(s) of VoIP user devices, one of which is designated at reference numeral 105. Example VoIP user devices 105 include, but are not limited to, an IMS (e.g., VoIP) phone, a VoIP residential gateway, a VoIP enabled personal computer (PC), a VoIP endpoint, a wireless VoIP device (e.g., a wireless-fidelity (WiFi) Internet protocol (IP) phone), a VoIP adapter (e.g., an analog telephone adapter (ATA)), a VoIP enabled personal digital assistant (PDA), and/or a VoIP kiosk. The example VoIP device 105 of FIG. 1 may be implemented and/or be found at any number and/or type(s) of locations. Further, the VoIP device 105 may be a fixed location device, a substantially fixed location device and/or a mobile device. Moreover, the VoIP device 105 may have equipment communicatively and/or electrically coupled to it. For example, a VoIP ATA may be coupled to a telephone, and/or a VoIP residential gateway may be coupled to a PC and/or set-top box.

To access IMS communication services throughout and/or within a site, location, building, geographic area and/or geographic region, the example IMS communication system of FIG. 1 includes any number and/or type(s) of access networks, one of which is designated in FIG. 1 with reference number 110. In general, the example access network 110 provides and/or facilitates a communicative coupling of the VoIP user device 105 to and/or with an IMS network 115, which provides and/or enables IMS communication services (e.g., telephone services, Internet services, data services, messaging services, instant messaging services, electronic mail (email) services, chat services, video services, audio services, gaming services, voicemail, facsimile services, etc.) to the VoIP device 105. However, in some examples, a VoIP device 105 may access the IMS network 115 without use of an access network 110. The example access network 110 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, the example VoIP device 105 is depicted as having an associated access network 110, such a depiction is merely illustrative. For example, a VoIP device 105 may be configured and/or capable to utilize more than one access network 110 at the same and/or different times, a VoIP device 105 may be configured to access the IMS network 115 directly and/or via an IP network without an intervening access network 110, etc.

To provide communication services, the example IMS based VoIP communication system of FIG. 1 includes one or more IMS networks, one of which is designated in FIG. 1 with reference numeral 115. As described more fully below in connection with FIG. 5, the example IMS network 115 of FIG. 1 provides and/or enables, in addition to other things (e.g., traditional VoIP and/or IMS communication sessions and/or services), call-associated content services to presentation-capable and/or multimodal use VoIP devices, such as the example VoIP device 105. As used herein, the term "call-associated content" refers to content provided to a VoIP device 105 by a content server 120 (e.g., an interactive voice response (IVR) system and/or any type of VoIP-based automata), where the content is selected by the content server 120 based on a communication session (e.g., call) between the VoIP device 105 and the content server 120. The example content server 120 of FIG. 1 includes one or more servers to facilitate the communication session (e.g., a voice communication session server 121) and to facilitate the delivery of the call-associated content (e.g., a web-services server 122). Example call-associated content includes, but is not limited to, advertisements displayed by the VoIP device 105 while speaking to a retail business, technical support information displayed by the VoIP device 105 while speaking with technical support personnel, text of the information being provided in an IVR communication session for persons with hearing impairments, etc. In the illustrated example of FIG. 1, the call-associated content is provided to the VoIP device 105 via a separate communication session from the actual call to allow a user of the VoIP device 105 to simultaneously participate in the original communication session (e.g., call), while being presented with and/or reviewing the call-associated content at the VoIP device 105 (e.g., via a display 125 of the VoIP device 105). While in the illustrated example the call-associated content is graphical content that is web-based (e.g., presented as a series of web pages) and the content is associated with a voice-based communication session (e.g., a telephone call), any type of content (graphical, video, image, text and/or otherwise) may be associated with any type of communication session (e.g., a video conference, a text message session, etc.).

When the example VoIP device 105 initiates a communication session (e.g., a voice-based telephony communication session) to the example content server 120, the example IMS network 115 of FIG. 1 determines a) whether the content server 120 has call-associated content for the voice communication session, and b) whether the calling VoIP device 105 is capable of displaying and/or presenting call-associated content. When the content server 120 has call-associated content for the initiated communication session, and when the VoIP device is capable of displaying and/or presenting the associated content, the IMS network 115 facilitates and/or mediates the delivery of the call-associated content to the VoIP device 105 from the content server 120. By mediating the delivery of the call-associated content from the content server 120 to the VoIP device 105, the IMS network 115 can facilitate the delivery of call-associated content across and/or between more than one VoIP-based communication network (e.g., operated by different service providers and/or in different administrative domains), can ensure and/or check the integrity of the call-associated content before it is provided to the VoIP device 105 (e.g., only received call-associated content from an authorized content source), and/or provides a consistent means of receiving call-associated content regardless of who operates a particular content server. For instance, in the illustrated example of FIG. 1, the content server 120 is communicatively coupled to the example IMS network 115 via an intervening terminating network 130. The example terminating network 130 of FIG. 1 may be a VoIP-based network, a PSTN-based network, and/or any combination of VoIP and PSTN based networks. Even though the terminating network 130 may be operated by a different service provider than that operating the IMS network 115, the example IMS network 115 facilitates and/or mediates the delivery of call-associated content from the content server 120 to the VoIP device 105 via the terminating network 130.

In contrast, traditional VoIP communication networks rely on content servers to provide the call-associated content directly to VoIP devices. For example, in known systems a content server sends a communication session initiation request to a VoIP device to provide the call-associated content. However, in such examples, the delivery of call-associated content may not be possible if the call-associated content must pass through and/or be processed by more than one VoIP communication network. Moreover, traditional delivery of call-associated content from a content server to a VoIP device does not allow a VoIP service provider and/or VoIP-based enterprise (e.g., a company, a school, a government agency, a medical facility, etc.) to protect its VoIP devices from corrupt, malicious and/or inappropriate call-associated content provided by the content server.

To mediate the delivery of call-associated content between the content server 120 and the VoIP device 105, the example IMS network 115 of FIG. 1 includes a content mediator 135. In general, the example content mediator 135 of FIG. 1 implements a web-services client to obtain call-associated content from the content server 120 (e.g., the example web-services server 122), and implements a web server to facilitate providing the call-associated content to the VoIP device 105. As described more fully below in connection with FIGS. 4 and 5, when the example content mediator 135 of FIG. 1 is notified that there is call-associated content for a voice communication session (e.g., by a serving call session control function (S-CSCF) server 145), the example content mediator 135 (e.g., a web-services client) initiates a web-services communication session 136 with the content server 120 (e.g., the example web-services server 122) to obtain the call-associated content. The example content mediator 135 (e.g., a web server) also initiates a hyper-text transfer protocol (HTTP) communication session 138 with the VoIP device 105 to provide the call-associated content obtained from the content server 120 to the VoIP device 105. To enable the content server 120 (e.g., the example web-services server 122) to identify the call-associated content, the content mediator 135 provides to the content server 120 (e.g., in a web-services NOTIFY message) one or more call dialog parameters used to initiate and/or establish the voice communication session between the VoIP device 105 and the content server 120. Example call dialog parameters include, but are not limited to, a call identification number, "to" header field contents from an original SIP INVITE message, and/or "from" header field contents from an original SIP INVITE message. Likewise, to allow the VoIP device 105 to associate the content with the voice communication session, the content mediator 135 provides to the VoIP device 105 (e.g., in a SIP NOTIFY message) the one or more call dialog parameters used to initiate and/or establish the voice communication session between the VoIP device 105 and the content server 120. An example manner of implementing the example content mediator 135 of FIG. 1 is described below in connection with FIG. 4.

In the example IMS communication system of FIG. 1, the example VoIP device 105 is communicatively coupled to the example IMS network 115 via the example access network 110, and/or any number and/or type(s) of private and/or public IP based communication networks such as, for example, the Internet, one of which is illustrated in FIG. 1 with reference numeral 140. While in the illustrated example of FIG. 1, the example VoIP device 105 is depicted as having an associated IP network 140, such a depiction is merely illustrative. For example, the example VoIP device 105 may be configured and/or capable to utilize more than one IP network 140 at the same and/or different times, etc. In general, the example IP network 140 of FIG. 1 provides and/or facilitates a communicative coupling of the VoIP device 105 to and/or with the IMS network 115.

In some examples, the VoIP device 105 may be communicatively coupled to the access network 110 via one or more additional IP based networks and/or devices (not shown), such as a local area network (LAN), a gateway and/or a router located within a place of business, a school and/or a residence. The example VoIP device 105 of FIG. 1 is communicatively coupled to the example access network 110, the example IP network 140 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example VoIP device 105 may be coupled to the example access network 110, the example IP network 140, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access network 110, and/or the example IP network 140 of FIG. 1 may extend geographically to include one or more locations near to and/or encompassing one or more of the VoIP device 105. For example, the access network 110 may include a wireless access point (not shown) by which, for example, a WiFi IP phone 105 connects to the IP network 140 and the IMS network 115.

In the example IMS communication system of FIG. 1, the example access network 110, the example IP network 140, and the IMS network 115 need not be owned, implemented, and/or operated by a single service provider. For example, the VoIP device 105 may access IMS services provided by an IMS network 115 that is owned, operated and/or implemented by a first service provider via an access network 110, which is owned, operated and/or implemented by a different service provider. However, any or all of the access network 110, the IMS network 115 and/or the IP network 140 may be operated by the same service provider.

In the illustrated example IMS communication system of FIG. 1, each VoIP device (e.g., the example VoIP device 105) that is registered to the example IMS network 115 is associated with and/or assigned to a serving call session control function (S-CSCF) server (one of which are designated in FIG. 1 with reference numeral 145). The example S-CSCF server 145 of FIG. 1 is responsible for handling incoming and/or outgoing IMS (e.g., VoIP) communication sessions (e.g., telephone calls, and/or data and/or video sessions) associated with its registered VoIP devices. An example manner of implementing the example S-CSCF 145 of FIG. 1 is described below in connection with FIG. 5.

While one S-CSCF server 145 is illustrated in FIG. 1, the IMS network 115 may include any number and/or type(s) of S-CSCF servers, and each such S-CSCF server may support any number and/or type(s) of VoIP devices. The example S-CSCF server 145 of FIG. 1 performs session control, maintains session states and/or enables communications with call feature servers (e.g., the example feature servers 150 of FIG. 1) for its associated and/or registered VoIP devices. For instance, when the calling VoIP device 105 initiates, for example, an outgoing telephone call to the example content server 120 (e.g., the example voice communication session server 121), a communication session initiation message (e.g., a SIP INVITE message) is routed by the IMS network 115 from the VoIP device 105 to the S-CSCF server 145 associated with that particular VoIP device 105.

To locate and/or identify the VoIP device and/or endpoint (e.g., the example content server 120) associated with a called party (e.g., a called telephone number), the example IMS network 115 of FIG. 1 includes any number of ENUM servers, one of which is designated in FIG. 1 with reference numeral 155. Based upon an ENUM query request message received from a S-CSCF server (e.g., the example S-CSCF server 145), the example ENUM server 155 of FIG. 1 performs a lookup of an ENUM database 160 that stores associations of called party identifiers (e.g., E.164 telephone numbers) to one or more uniform resource identifiers (URIs) (e.g., a SIP URI, an HTTP URI, etc.). However, the ENUM database 160 may store any number and/or type(s) of associations between any number and/or type(s) of identifiers. An example data structure that may be used to implement the example ENUM database 160 of FIG. 1 is described below in connection with FIG. 3.

By performing a lookup of the ENUM database 160, a SIP URI (e.g., an IP address) for a called device can be identified based upon a called telephone number assigned to the called device. If the called device (e.g., the example content server 120) is configured to provide call-associated content for the called telephone number, the example ENUM database 160 also stores a second URI (e.g., an HTTP URI) for a web-services server (e.g., the example web-services server 122) at the called device. As described more fully below, the second URI can be used by, for example, the example content mediator 135 to obtain the call-associated content on behalf of the calling VoIP device 105. In some examples, the ENUM database 160 also contains a third SIP URI associated with each called telephone number that identifies a content mediator (e.g., the example content mediator 135) to be used to obtain the call-associated content on the behalf of the calling VoIP device 105.

In response to the communication session initiation message, the example S-CSCF server 145 sends an ENUM query request message to an ENUM server (e.g., the example ENUM server 155) to obtain an identifier (e.g., a SIP URI) for the called party (e.g., the example voice communication server 121 at the example content server 120). The URI obtained from the example ENUM server 155 is used by the S-CSCF server 145 to establish the requested communication session. If the ENUM server 155 also returns a second URI (e.g., an HTTP URI) for an associated content server at the called party (e.g., the example web-services server 122), the example S-CSCF server 145 of FIG. 1 notifies a content mediator (e.g., a content mediator 135 identified by a third URI returned by the ENUM server 155) that there is call-associated content for the initiated communication session (e.g., sends a SIP NOTIFY message to the content mediator 135). In the illustrated example of FIG. 1, the notification (e.g., the SIP NOTIFY message) sent to the content mediator 135 includes one or more call dialog parameters used to initiate and/or establish the requested communication session between the VoIP device 105 and the called device (e.g., included in a SIP INVITE message sent by the S-CSCF server 145 to the called device). Example call dialog parameters include, but are not limited to, a call identification number, "to" header field contents from the SIP INVITE message sent to the called device, and/or "from" header field contents from SIP INVITE message sent to the called device.

To provide an access entry point for a VoIP device (e.g., the example VoIP device 105) into the IMS network 115, the example IMS network 115 of FIG. 1 includes any number and/or type(s) of proxy call session control function (P-CSCF) servers, one of which is designated in FIG. 1 with reference numeral 165. The example P-CSCF server 165 of FIG. 1, among other things, route SIP messages between VoIP devices and their associated S-CSCF server.

To locate and/or identify the S-CSCF server (e.g., the example S-CSCF server 145) associated with a VoIP device, the example IMS network 115 of FIG. 1 includes any number and/or type(s) of interrogating call session control function (I-CSCF) servers, one of which is designated in FIG. 1 with reference number 170. The example I-CSCF server 170 of FIG. 1 serves as a contact point within the example IMS network 115 for connections destined for a VoIP device 105 of the IMS communication system, and/or for a VoIP device 105 currently located within the serving area of the IMS network 115 (e.g., a roaming subscriber). For example, for a destination identified by the example ENUM server 155, the example I-CSCF 170 identifies to which S-CSCF server 145 the final destination VoIP device 105 is registered. IMS protocol messages (e.g., SIP messages) directed to the destination VoIP device 105 are then routed to the S-CSCF server 145 identified by the I-CSCF 170. If a destination identified by the ENUM server 155 is associated with a device not associated with the IMS network 115 (e.g., a PSTN device, a PLMN device and/or a VoIP device served by a different IMS and/or VoIP network), protocol messages directed to the destination are routed to a border element 175.

The example border element 175 of FIG. 1 facilitates communication between devices (e.g., the example VoIP device 105) of the example IMS network 115 and devices of other communication networks (e.g., the example content server 120), such as other IMS networks, other VoIP networks, a PLMN (e.g., a cellular communication network) and/or a PSTN. While a single border element 175 is illustrated in FIG. 1, it will be understood that any number and/or type(s) of border elements 175 may be implemented by the example IMS network 115 to facilitate communication between the IMS network 115 and any number and/or type(s) of other communication networks. Example border elements 175 include, but are not limited to, a media gateway and/or a peered border element.

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 180. The example HSS 180 of FIG. 1 maintains a device profile and/or one or more preferences for each subscriber and/or VoIP device 105 of the IMS network 115. The example I-CSCF server 170 of FIG. 1 uses information contained in the HSS 180 to, for example, determine and/or locate the S-CSCF server 145 associated with a particular subscriber and/or VoIP device 105.

To provide one or more additional call features, the example IMS network 115 of FIG. 1 includes any number and/or type(s) of application servers, one of which is designated in FIG. 1 with reference numeral 150. The example application server 150 of FIG. 1 (also referred to herein as a "feature server") provide and/or implement additional service features for subscribers (e.g., call barring, calling name delivery and/or blocking, call blocking, call forward, call busy transfer, call screening, call forking, call trace, voicemail, announcement servers, call trees, etc.). Example application servers 150 include, but are not limited to, voice over Internet protocol (VoIP) feature servers. The application server 150 may be used to provide and/or implement call features and/or services for calling and/or called parties.

As illustrated in FIG. 1, the example content mediator 135, the example S-CSCF server 145, the example feature server 150, the example ENUM server 155, the example P-SCSCF server 165, the example I-CSCF server 170, the example border element 175 and/or the example HSS 180 communicate and/or are communicatively coupled via any number, type(s) and/or combination of communication paths, communication networks, busses and/or communication devices 185.

While an example IMS-based VoIP communication system and an example IMS network 115 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example content mediator 135, the example S-CSCF server 145, the example feature server 150, the example ENUM server 155, the example P-SCSCF server 165, the example I-CSCF server 170, the example border element 175 and/or the example HSS 180 illustrated in FIG. 1 are logical entities of the example IMS network 115. They may, therefore, be implemented separately and/or in any combination using, for example, machine accessible instructions executed by one or more computing devices and/or computing platforms (e.g., the example processing platform 800 of FIG. 8). Further, the example VoIP device 105, the example content server 120, the example voice communication session server 121, the example web-services server 122, the example content mediator 135, the example S-CSCF server 145, the example feature server 150, the example ENUM server 155, the example P-SCSCF server 165, the example I-CSCF server 170, the example border element 175 and/or the example HSS 180 and/or, more generally, the example IMS network 115 may be implemented by hardware, software, firmware and/or any combination of hardware, software and/or firmware. Further still, the example IMS-based VoIP communication system and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (BGCF) servers, breakout gateway control function (BGCF) severs, soft switches, and/or session border controllers.

Figure 2:
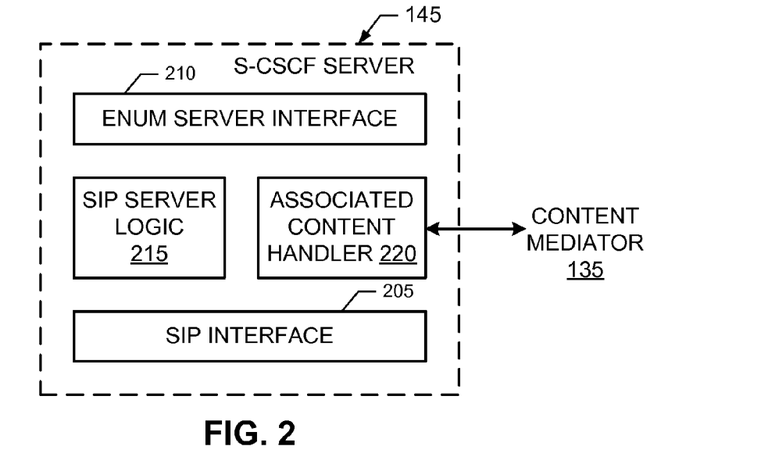
FIG. 2 illustrates an example manner of implementing the example serving call session control function (C-CSCF) server of FIG. 1.

FIG. 2 illustrates an example manner of implementing the example S-CSCF server 145 of FIG. 1. To allow the example S-CSCF server 145 of FIG. 2 to receive and/or send SIP messages, the example S-CSCF server 145 includes any type of SIP interface 205. The example SIP interface 205 of FIG. 2 allows the example S-CSCF server 145 to exchange one or more SIP messages with one or more other devices such as a VoIP device, a border element, a content server, an I-CSCF server, an HSS, and/or any other call server.

To interact with an ENUM server (e.g., the example ENUM server 155 of FIG. 1), the example S-CSCF server 145 of FIG. 2 includes an ENUM server interface 210. The example ENUM server interface 210 of FIG. 2 is used to send an ENUM query message to an ENUM server and/or to receive an ENUM query response message from the ENUM server. An example ENUM server interface 210 is implemented in accordance with Internet Engineering Task Force (IETF) Request for Comment (RFC) 3761.

To process and/or handle SIP messages, the example S-CSCF 145 of FIG. 2 includes SIP server logic 215. The example SIP server logic 215 of FIG. 2 implements a state engine and/or maintains state information for SIP transactions, dialogs, and/or communication sessions including, for example, handling registrations and/or handling incoming/outgoing calls as defined in Internet Engineering Task Force (IETF) Request for Comment (RFC) 3261. For example, when a communication session request is received from a calling party at the S-CSCF 145, the example SIP server logic 215 performs an ENUM lookup for the called party by sending an ENUM query message to an ENUM server (e.g., the example ENUM server 130 of FIG. 1) via the example ENUM server interface 210.

To facilitate the delivery of call-associated content to VoIP devices, the example S-CSCF server 145 of FIG. 2 includes an associated content handler 220. When a second URI (e.g., an HTTP URI) for call-associated content is return from the ENUM server via the ENUM server interface 210, the example associated content handler 220 of FIG. 2 checks and/or determines whether the calling VoIP device is capable and/or configured to display call-associated content. If the calling VoIP device capable and/or configured to display call-associated content, the associated content handler 220 notifies and/or instructs a content mediator (e.g., the example content mediator 130 of FIG. 1) to obtain the call-associated content via the second URI. The content mediator then provides the obtained call-associated content to the calling VoIP device. In some examples, the ENUM server also returns a third SIP URI for the content mediator. In other examples, the associated content handler 220 is provisioned with a SIP URI for the content mediator. To notify the content mediator, the example associated content handler 220 of FIG. 2 sends a SIP NOTIFY message to the content mediator that includes the second URI and one or more call dialog parameters used to initiate and/or establish the requested communication session between the VoIP device 105 and the called device (e.g., included in a SIP INVITE message sent by the S-CSCF server 145 to the called device). Example call dialog parameters include, but are not limited to, a call identification number, "to" header field contents from the SIP INVITE message sent by the SIP server logic 215 to the called device via the first URI returned by the ENUM server, and/or "from" header field contents from SIP INVITE message sent by the SIP server logic 215 to the called device via the first URI returned by the ENUM server. Example machine accessible instructions that may be executed to implement the example associated content handler 220 and/or, more generally, the example S-CSCF 145 to facilitate a call-associated content service are described below in connection with FIG. 6.

While an example manner of implementing the example S-CSCF 145 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. For example, the S-CSCF 145 may be implemented by modifying and/or enhancing a traditional and/or existing S-CSCF by the addition of one or more functions of the example associated content handler 220. Further, the example SIP interface 205, the example ENUM interface 210, the example SIP server logic 215, the example associated content handler 220 and/or, more generally, the example S-CSCF 145 may be implemented by hardware, software, firmware and/or any combination of hardware, software and/or firmware. Further still, the example S-CSCF 145 may include interfaces, data structures, elements, processes and/or devices instead of, or in addition to, those illustrated in FIG. 2 and/or may include more than one of any or all of the illustrated interfaces, data structures, elements, processes and/or devices. For example, the S-CSCF 145 may include and/or implement one or more additional capabilities, interfaces and/or protocols in accordance with one or more past, present and/or future standards and/or specifications (e.g., a DIAMETER interface and/or protocol for interacting with a HSS). Such standards and/or specifications may be developed by organizations such as, for example, 3GPP, TISPAN and/or IETF.

Figure 3:
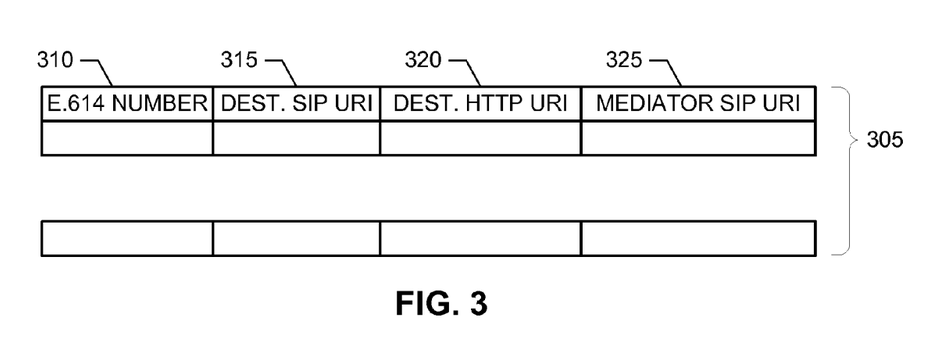
FIG. 3 illustrates an example database that may be used to implement the example tElephone NUMber mapping (ENUM) database of FIG. 1.

FIG. 3 illustrates an example data structure that may be used to implement the example ENUM database 160 of FIG. 1. The example data structure of FIG. 3 includes a respective entry 305 for each of a plurality of called destinations. To identify destinations each of the example entries 305 of FIG. 3 includes a telephone number field 310. The example telephone number field 310 of FIG. 3 contains one or more numbers and/or alphanumeric characters that represent one or more subscribers. For example, the telephone number field 310 may contain an E.164 telephone number, SIP URI, and/or represent a range and/or block of E.164 telephone numbers (e.g., 512-372-xxxx). An entry 305 corresponding to a called destination may be identified by comparing the telephone number and/or SIP URI received in an ENUM query request message with the contents of the telephone number field 310.

To store a SIP URI for the called destination, each of the example entries 305 of FIG. 3 includes a destination SIP URI field 315. The example destination SIP URI field 315 of FIG. 3 contains one or more numbers and/or alphanumeric characters that represent an address (e.g., an IP address) to which protocol messages can be routed to the called destination.

To store an HTTP URI that may be used to obtain call-associated content from the called destination, each of the example entries 305 of FIG. 3 includes a destination HTTP URI field 320. The example destination HTTP URI field 320 of FIG. 3 contains one or more numbers and/or alphanumeric characters that represent an address (e.g., an IP address) from which call-associated content may be obtained.

To store a mediator SIP URI that may be used to obtain call-associated content on behalf of a calling VoIP device, each of the example entries 305 of FIG. 3 includes a mediator SIP URI field 325. The example mediator SIP URI field 325 of FIG. 3 contains one or more numbers and/or alphanumeric characters that represent a content mediator (e.g., the example content mediator 135 of FIG. 1). In some examples, one or more of the entries 305 may not include a mediator SIP URI. Instead, the S-CSCF server handling the requested communication session uses a provisioned content mediator SIP URI to obtain the call-associated content on behalf of the calling VoIP device.

While an example data structure that may be used to implement the example ENUM database 160 of FIG. 1 is illustrated in FIG. 3, the example data structure of FIG. 3 may be implemented using any number and/or type(s) of other and/or additional entries, fields and/or data. Further, the entries, fields and/or data illustrated in FIG. 3 may be combined, divided, re-arranged, eliminated and/or implemented in any way. Moreover, the example data structure may include additional entries, fields and/or data than those illustrated in FIG. 3 and/or may include more than one of any or all of the illustrated entries, fields and/or data.

Figure 4:
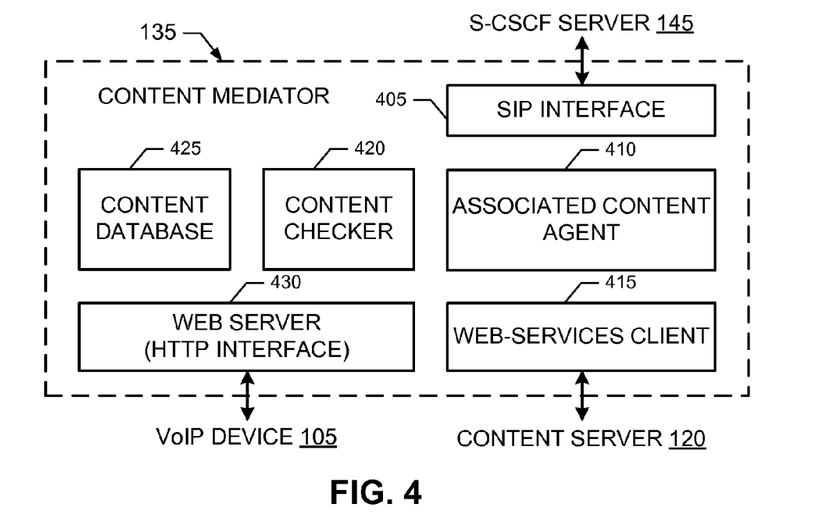
FIG. 4 illustrates an example manner of implementing the example content mediator of FIG. 1.

FIG. 4 illustrates an example manner of implementing the example content mediator 135 of FIG. 1. To allow the example content mediator 135 of FIG. 4 to receive and/or send SIP messages, the example content mediator 135 includes any type of SIP interface 405. The example SIP interface 405 of FIG. 4 allows the example content mediator 135 to exchange one or more SIP messages (e.g., a SIP NOTIFY message and/or a SIP REFER message) with one or more other devices such as the example S-CSCF server 145 of FIG. 1.

To obtain called associated content, the example content mediator 135 of FIG. 4 includes an associated content agent 410 and a web-services client 415. When the content mediator 135 is notified by an S-CSCF server (e.g., the example S-CSCF server 145 of FIG. 1) to obtain call-associated content (e.g., by receiving a SIP NOTIFY message via the example SIP interface 405), the example associated content agent 410 of FIG. 4 interacts with the web-services server (e.g., the example web-services server 122) specified in the notification to obtain the call-associated content. The notification received from the S-CSCF server includes a URI for the web-services server, and one or more call dialog parameters used to initiate and/or establish the requested communication session between the calling VoIP device 105 and the content server (e.g., included in a SIP INVITE message sent by the S-CSCF server 145 to a voice communication session server 121 at the content server 122). Example call dialog parameters include, but are not limited to, a call identification number, "to" header field contents from the SIP INVITE message, and/or "from" header field contents from the SIP INVITE message. The example associated content agent 410 obtains the call-associated content via the example web-services client 415.

Using any protocols, messages and/or exchanges (e.g., those defined by a past, present and/or future web-services protocol), the example web-services client 410 of FIG. 4 requests and/or obtains call-associated content from a content server (e.g., the example web-services server 122 of FIG. 1). The example web-services client 410 sends a web-services NOTIFY message to the web-services server to request the call-associated content. The web-services NOTIFY message includes one or more call dialog parameters used to initiate and/or establish an initial communication session between the calling VoIP device 105 and the content server (e.g., included in a SIP INVITE message sent by the S-CSCF server 145 to a voice communication session server 121 at the content server 120). Example call dialog parameters include, but are not limited to, a call identification number, "to" header field contents from the SIP INVITE message, and/or "from" header field contents from the SIP INVITE message. In response to the web-services NOTIFY message, the web-services server pushes the requested call-associated content to the web-services client 415. An example application programming interface (API) between the web-services client 415 and a content server (e.g., the example web-services server 122 of the example content server 120) is implemented in accordance with one or more past, present and/or future simple object access protocol (SOAP) and/or eXtended Markup Language (XML) specification(s) and/or standard(s). Data, messages and/or information may be transported between the web-services client 415 and the content server via HTTP.

To verify call-associated content obtained by the associated content agent 410 and/or the example web-services client 415, the example content mediator 135 of FIG. 4 includes a content checker 420. Using any algorithm(s), filter(s) and/or business rule(s), the example content checker 420 verifies the integrity and/or suitability of the obtained call-associated content. When the example content checker 420 verifies the call-associated content, the call-associated content is stored in a content database 425 for later retrieval by and/or delivery to a call VoIP device (e.g., the example VoIP device 105 of FIG. 1). The example content database 425 of FIG. 4 may be implemented using any number and/or type(s) of data structures, and may be stored using any number and/or type(s) of memory(-ies) and/or memory device(s).

Once the call-associated content is obtained, verified and stored in the content database 425, the example associated content agent 410 of FIG. 4 notifies the call VoIP device that call-associated content is available. The example associated content agent 410 sends a SIP REFER message to the calling VoIP device via the example SIP interface 405. The SIP REFER message includes an HTTP URI from which the call-associated content may be retrieved from the content mediator 135, and one or more call dialog parameters used by the calling VoIP device to initiate and/or establish an initial communication session between the calling VoIP device and the content server (e.g., included in a SIP INVITE message sent by the calling VoIP device to its associated S-CSCF server 145. Example call dialog parameters include, but are not limited to, a call identification number, "to" header field contents from the SIP INVITE message, and/or "from" header field contents from the SIP INVITE message.

To provided call-associated content to VoIP devices (e.g., the example VoIP device 105 of FIG. 1), the example content mediator 135 of FIG. 4 includes a web server 320 that implements, for example, an HTTP interface. The example web server 430 of FIG. 4 implements one or more traditional HTTP server functions to allow a VoIP device (e.g., a web client) to request and then download call-associated content stored in the content database 425. In response to an HTTP GET message received by the web server 430, the example web server 430 provides the call-associated content associated with the HTTP URI designated in the HTTP GET message to the VoIP device.

In some examples, the example content database 425 and/or, more generally, the example content mediator 135 of FIG. 4 cache call-associated content to reduce duplicative retrieval of call-associated content from content servers. For example, call-associated content may stored with an associated expiration date and/or time. If a request for already stored call-associated content is received by the content mediator 135 before the call-associated content expires, the content mediator 135 provides the call-associated content to the calling VoIP device without the need to interact with the content server.

While an example manner of implementing the content mediator 135 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. Further, the example SIP interface 405, the example associated content agent 410, the example web-services client 415, the example content checker 420, the example web server 430 and/or, more generally, the example content mediator 135 may be implemented by hardware, software, firmware and/or any combination of hardware, software and/or firmware. Further still, the example content mediator 135 may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
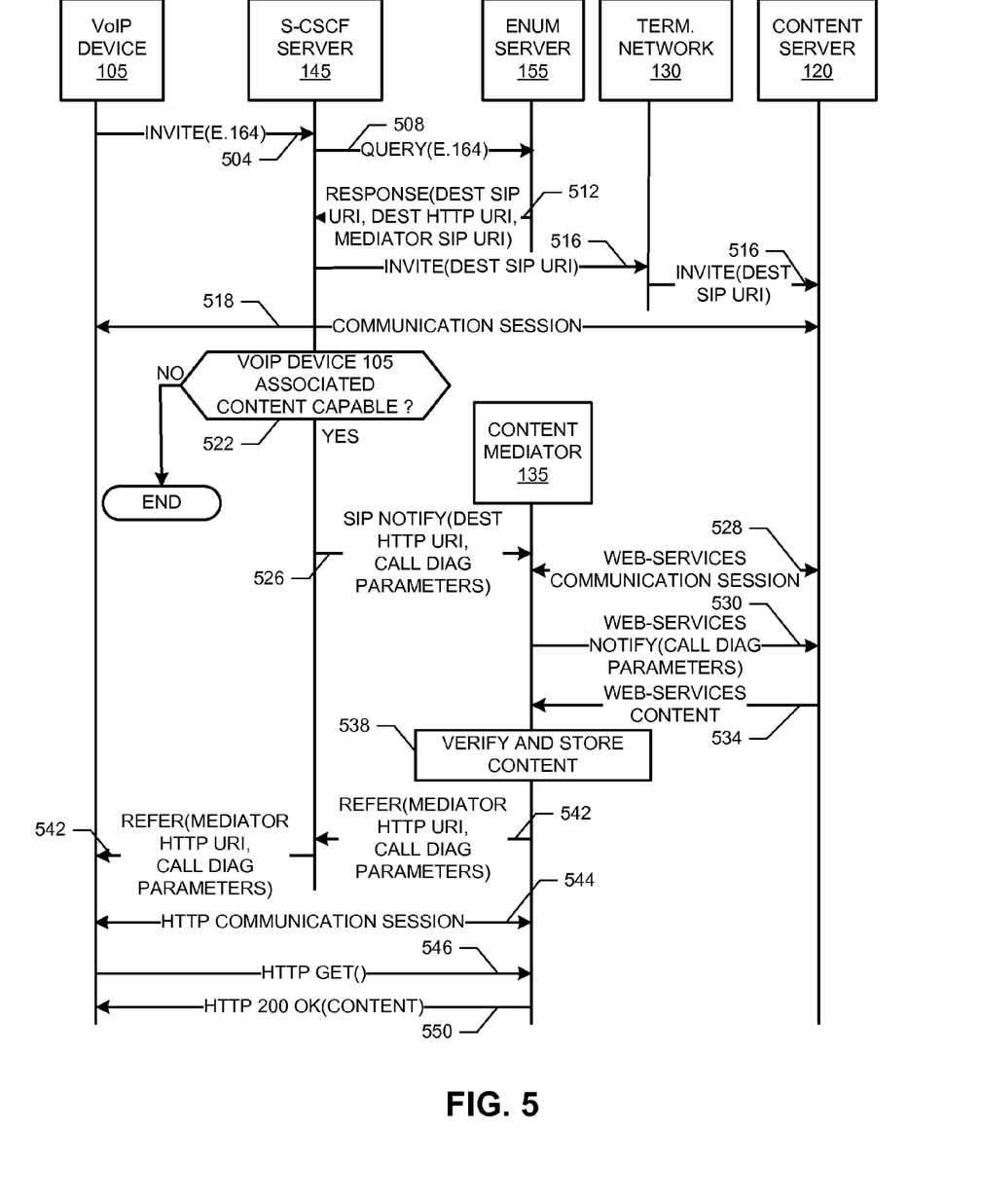
FIG. 5 illustrates example protocol message exchanges and flowcharts representative of machine accessible instructions that may be executed to implement any or all of the example VoIP devices, the example S-CSCF servers, the example ENUM servers, the example content mediators and/or, more generally, the example IMS network of FIGS. 1-4.

FIG. 5 illustrates example protocol message exchanges, and/or flowcharts representative of example machine accessible instructions that may be executed to implement the example VoIP device 105, the example content server 120, the example terminating network 130, the example content mediator 135, the example S-CSCF server 145, the example ENUM 155 and/or, more generally, the example IMS network 115 of FIGS. 1-4. The example exchanges and/or the example machine accessible instructions of FIG. 5 may be carried out one or more processor(s), controller(s) and/or any other suitable processing device(s). For example, the example exchanges and/or the example machine accessible instructions of FIG. 5 may be embodied in coded instructions stored on a tangible medium such as a flash memory, a read-only memory (ROM) and/or random-access memory (RAM) associated with a processor (e.g., the example processor 805 discussed below in connection with FIG. 8). Alternatively, some or all of the example exchanges and/or the example machine accessible instructions of FIG. 5 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIG. 5 may be implemented manually or as any combination(s) of any of the foregoing techniques, for example, as any combination of firmware, software, discrete logic and/or hardware. Persons of ordinary skill in the art will readily appreciate that many other methods of implementing the example VoIP device 105, the example content server 120, the example terminating network 130, the example content mediator 135, the example S-CSCF server 145, the example ENUM 155 and/or, more generally, the example IMS network 115 of FIGS. 1-4 may be employed. For example, the order of execution of the blocks of the example flowcharts and/or the example exchanges of FIG. 5 may be changed, and/or some of the blocks and/or exchanges described may be changed, eliminated, sub-divided, and/or combined. Additionally, persons of ordinary skill in the art will appreciate that any or all of the example exchanges and/or the example machine accessible instructions of FIG. 5 may be carried out sequentially and/or carried out in parallel by, for example, separate processing threads, processors, devices, discrete logic, circuits, etc.

The example protocol message exchanges of FIG. 5 begin with the example calling VoIP device 105 sending a communication session initiation message 504 (e.g., a SIP INVITE message), which specifies the content server 120 as the destination for the communication session to its associated S-CSCF 145. The S-CSCF 145 sends an ENUM query request message 508 to the ENUM server 155 and receives an ENUM query response message 512. The example ENUM query response message 512 of FIG. 5 includes a destination SIP URI (e.g., the example destination SIP URI 315 of FIG. 3) for a voice communication session server (e.g., the example server 121 of FIG. 1), a destination HTTP URI (e.g., the example destination HTTP URI 320) for a web-services server (e.g., the example server 122), and a mediator SIP URI (e.g., the example mediator SIP URI 325).

Using the destination SIP URI, the S-CSCF server 145 sends a SIP INVITE message 516 to content server 120 (e.g., the example voice communication session server 121 of FIG. 1) via the terminating network 130. Based on the SIP INVITE message 516, the voice communication session server 121 establishes a voice communication session 518 between the voice communication session server 121 and the calling VoIP device 105.

In the illustrated example of FIG. 5, the VoIP device 105 is call-associated content capable (block 522) and the S-CSCF server 145 sends a SIP NOTIFY message 526 to the content mediator 135. The example SIP NOTIFY message 526 of FIG. 5 contains the HTTP URI and one or more call dialog parameters used by the calling VoIP device 105, the S-CSCF 145 and/or the content server 120 to initiate and/or establish the communication session 518 between the calling VoIP device and the content server 120. Example call dialog parameters include, but are not limited to, a call identification number, "to" header field contents from the SIP INVITE message, and/or "from" header field contents from the SIP INVITE message. If the VoIP device 105 had not been call-associated content capable, the S-CSCF server 145 would have continued having the communication session 518 for the VoIP device 105 as is traditional.

In response to the SIP NOTIFY message 526, the content mediator 135 establishes a web-services communication session 528 between the content mediator 135 and the content server 120 (e.g., to the example web-services server 122 of FIG. 1) to obtain the call-associated content. The content mediator (e.g., the example web-services client 415) sends a web-services NOTIFY message 530 to the content server 120 to request the call-associated content via the web-services communication session 528. The example web-services NOTIFY message 530 of FIG. 5 contains one or more call dialog parameters used by the calling VoIP device 105, the S-CSCF 145 and/or the content server 120 to initiate and/or establish the communication session 518 between the calling VoIP device and the content server 120. The content server 120 responds to the web-services NOTIFY message 530 by providing 534 the call-associated content to the content mediator 135 via the web-services communication session 528.

The content mediator 135 verifies and stores the received call-associated content (block 538) and then notifies the calling VoIP device 105 that call-associated content is available. The content mediator 135 notifies the VoIP device 105 by sending a SIP REFER message 542 to the VoIP device 105 via the S-CSCF server 145. The example SIP REFER message 542 of FIG. 5 contains one or more call dialog parameters used by the calling VoIP device 105, the S-CSCF 145 and/or the content server 120 to initiate and/or establish the communication session 518 between the calling VoIP device and the content server 120.

In response to the SIP REFER message 542, the VoIP device 105 (e.g., a web client) establishes a HTTP communication session 544 between the VoIP device 105 and the content mediator 135, and sends a request message (e.g., an HTTP GET message) to the content mediator 155 via the HTTP communication session 544. The VoIP device 105 (e.g., the web client) then receives 550 the call-associated content from the content mediator 135 via the HTTP communication session 544.

Figure 6:
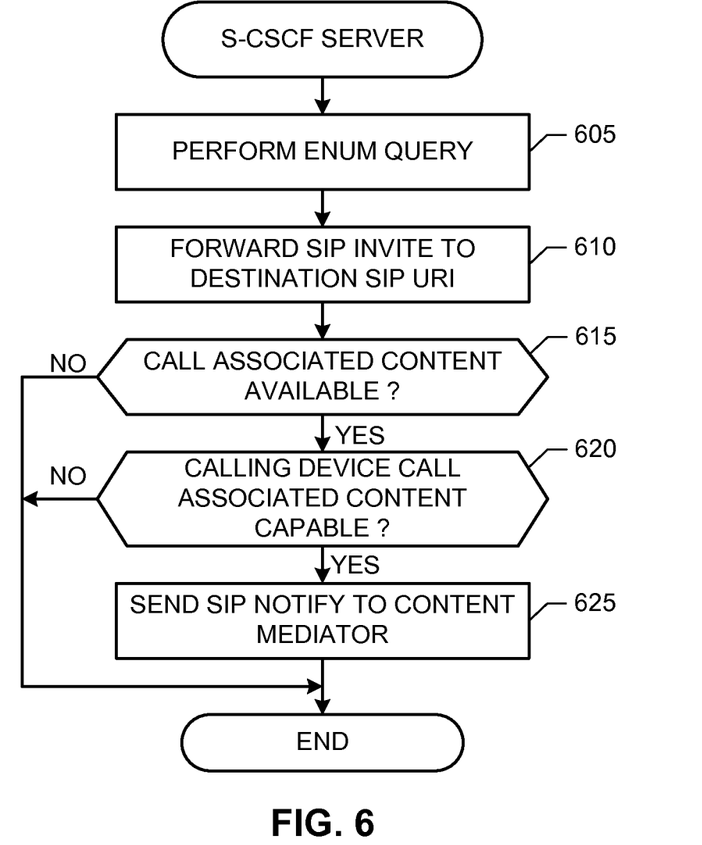
FIG. 6 is a flowchart representative of example machine accessible instructions that may be executed to implement any or all of the example S-CSCF servers of FIGS. 1 and/or 2.
Figure 7:
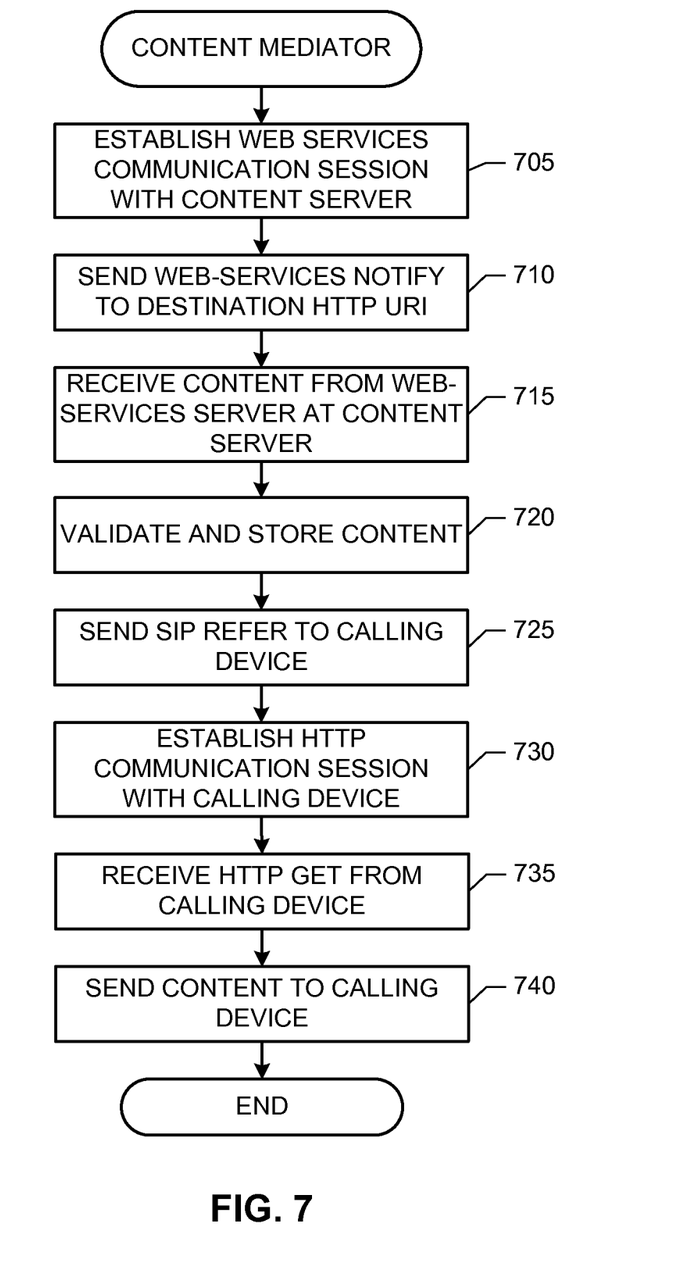
FIG. 7 is a flowchart representative of example machine accessible instructions that may be executed to implement any or all of the example content mediators of FIGS. 1 and/or 4.

FIG. 6 illustrates example machine accessible instructions that may be executed to implement any or all of the example S-CSCF servers 145 of FIGS. 1 and/or 2. FIG. 7 illustrates example machine accessible instructions that may be executed to implement any or all of the example content mediators 135 of FIGS. 1 and/or 4. The example machine accessible instructions of FIGS. 6 and/or 7 may be carried out by a processor, a controller and/or any other suitable processing device. For example, the example machine accessible instructions of FIGS. 6 and/or 7 may be embodied in coded instructions stored on a tangible medium such as a flash memory, a ROM and/or RAM associated with a processor (e.g., the example processor 805 discussed below in connection with FIG. 8). Alternatively, some or all of the example machine accessible instructions of FIGS. 6 and/or 7 may be implemented using any combination(s) of ASIC(s), PLD(s), FPLD(s), discrete logic, hardware, firmware, etc. Also, some or all of the example machine accessible instructions of FIGS. 6 and/or 7 may be implemented manually or as any combination of any of the foregoing techniques, for example, any combination of firmware, software, discrete logic and/or hardware. Further, although the example machine accessible instructions are described with reference to the flowcharts of FIGS. 6 and/7, persons of ordinary skill in the art will readily appreciate that many other methods of implementing the machine accessible instructions of FIGS. 6 and 7 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 6 and/or 7 may be carried out sequentially and/or carried out in parallel by, for example, separate processing threads, processors, devices, discrete logic, circuits, etc.

The example machine accessible instructions of FIG. 6 begin when a S-CSCF server (e.g., the example S-CSCF server 145 of FIGS. 1 and/or 2) receives a SIP INVITE message (e.g., the example SIP INVITE message 504 of FIG. 5 received via the example SIP interface 205 of FIG. 2) from a calling VoIP device (e.g., the example VoIP device 105). The S-CSCF server (e.g., the example SIP server logic 215) performs an ENUM database query (e.g., via the example ENUM server interface 210) (block 605).

The SIP service logic forwards and/or sends a SIP INVITE message to the called destination (e.g., the example voice communication session server 121 of FIG. 1) using a destination SIP URI (e.g., the example destination SIP URI 315 of FIG. 3) returned by an ENUM server (block 610).

The S-CSCF server (e.g., the example associated content handler 220 of FIG. 2) determines if there is call-associated content for the communication session (e.g., no additional URIs are returned by the ENUM server) (block 615). If there is no call-associated content for the communication session (block 615), control exits from the example machine accessible instructions of FIG. 6.

If there is call-associated content available (e.g., a destination HTTP URI is returned by the ENUM server) (block 615), but the associated content handler determines that the calling device is not call-associated content capable (block 620), control exits from the example machine accessible instructions of FIG. 6.

If there is call-associated content available (e.g., a destination HTTP URI is returned by the ENUM server) (block 615), and the calling device is call-associated content capable (block 620), associated content handler notifies a content mediator (e.g., the example content mediator 135) by sending a SIP NOTIFY message to the content mediator (block 625). Control then exits from the example machine accessible instructions of FIG. 6.

The example machine accessible instructions of FIG. 7 begin when a content mediator (e.g., example SIP interface 405 of FIG. 4) receives a notification (e.g., the example SIP NOTIFY 526 of FIG. 5) to mediate call-associated content for a calling VoIP device. The content mediator (e.g., the associated content agent 410 and the example web-services client 415) establishes a web-services communication session with a content server (e.g., the example web-services server 122 of FIG. 1) (block 705). The content mediator sends a web-services NOTIFY message (e.g., the example web-services NOTIFY message 530 to the content server via the web-services communication session (block 710). The web-services client then receives the call-associated content from the web-services server at the content server via the web-services communication session (block 715). The content mediator (e.g., the example content checker 420 of FIG. 4) then verifies the received call-associated content and stores the verified content (e.g., in the example content database 425) (block 720).

The associated content agent sends a SIP REFER message to the calling device via the SIP interface (block 725) and establishes an HTTP communications session with the calling device (block 730). When the content mediator (e.g., the example web server 430) receives an HTTP GET message from the calling device (e.g., a web client) via the HTTP communication session (block 735), the web server sends the call-associated content to the web client via the HTTP communication session (block 740). Control then exits from the example machine accessible instructions of FIG. 7.

Figure 8:
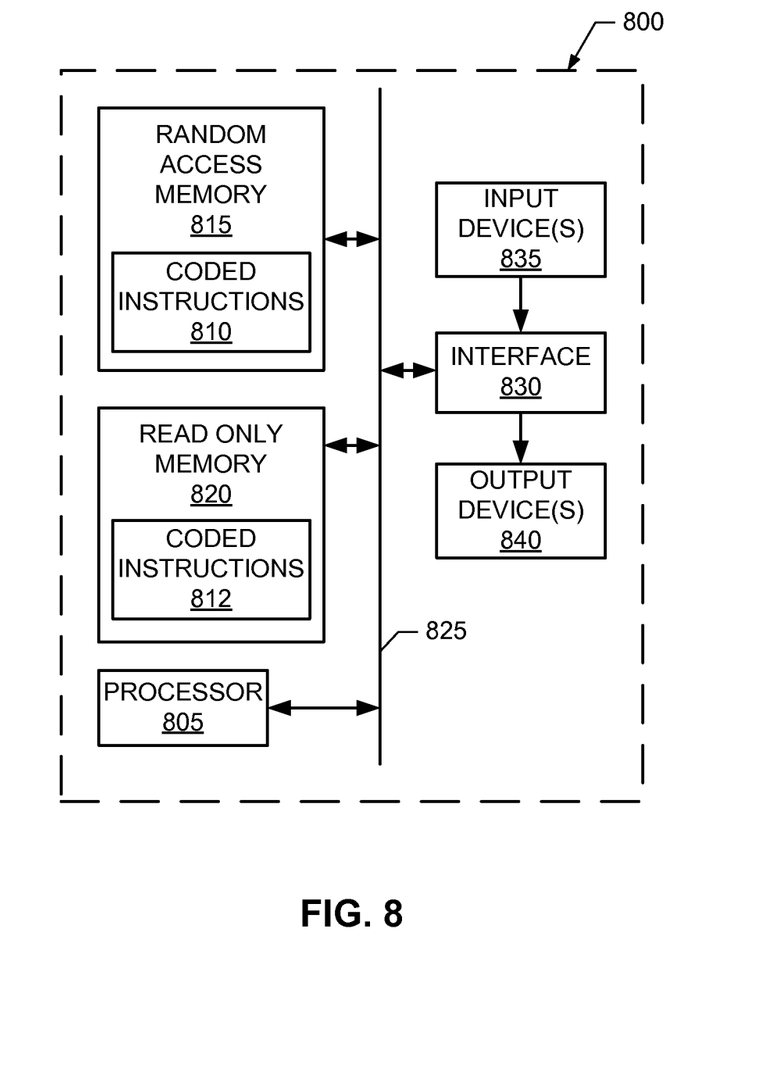
FIG. 8 is a schematic illustration of an example processor platform that may be used and/or programmed to carry out the example message exchanges and/or the example machine accessible instructions of FIGS. 5, 6 and/or 7 to implement any of all of the example methods and apparatus described herein.

FIG. 8 is a schematic diagram of an example processor platform 800 that may be used and/or programmed to implement all or a portion of any or all of the example VoIP device 105, the example content server 120, the example terminating network 130, the example content mediator 135, the example S-CSCF server 145, the example ENUM 155 and/or, more generally, the example IMS network 115 of FIGS. 1-4. For example, the processor platform 800 can be implemented by one or more general purpose processors, processor cores, microcontrollers, etc.

The processor platform 800 of the example of FIG. 8 includes at least one general purpose programmable processor 805. The processor 805 executes coded instructions 810 and/or 812 present in main memory of the processor 805 (e.g., within a RAM 815 and/or a ROM 820). The processor 805 may be any type of processing unit, such as a processor core, a processor and/or a microcontroller. The processor 805 may execute, among other things, the example protocol message exchanges and/or the example machine accessible instructions of FIGS. 5, 7 and/or 7 to implement the example methods and apparatus described herein.

The processor 805 is in communication with the main memory (including a ROM 820 and/or the RAM 815) via a bus 825. The RAM 815 may be implemented by DRAM, SDRAM, and/or any other type of RAM device, and ROM may be implemented by flash memory and/or any other desired type of memory device. Access to the memory 815 and 820 may be controlled by a memory controller (not shown).

The processor platform 800 also includes an interface circuit 830. The interface circuit 830 may be implemented by any type of interface standard, such as an external memory interface, serial port, general purpose input/output, etc. One or more input devices 835 and one or more output devices 840 are connected to the interface circuit 830. The input devices 835 and/or output devices 840 may be used to, for example, implement the example SIP interface 205 and/or the example ENUM server interface 210 of FIG. 2, and/or the example SIP interface 405, the example web-services client 415 and/or the example web server 430 of FIG. 4.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. A method comprising:
    performing a telephone number database query at a call session control function server to obtain a first uniform resource identifier for a destination and to obtain a second uniform resource identifier for the destination;
    establishing a first communication session to the destination based on the first uniform resource identifier; and
    initiating a second communication session on behalf of a calling device to the destination based on the second uniform resource identifier, the destination to provide content associated with the first communication session via the second communication session.

2. The method as defined in claim 1, wherein the second communication session is used to obtain content selected at the destination via the first communication session.

3. The method as defined in claim 1, wherein the first communication session is established by sending a session initiation protocol INVITE message to the first uniform resource identifier.

4. The method as defined in claim 1, wherein the second communication session is initiated by sending a session initiation protocol NOTIFY message to a content mediation platform, the NOTIFY message including the second uniform resource identifier.

5. The method as defined in claim 4, wherein the session initiation protocol NOTIFY message comprises a call dialog parameter to initiate the first communication session, wherein the destination is based on the call dialog parameter to associate the first and second communication sessions.

6. The method as defined in claim 1, wherein the first communication session is directed to a first server at the destination, and the second communication session is directed to a second server at the destination.

7. The method as defined in claim 6, wherein the second server is to provide web based content based on the first communication session.

8. The method as defined in claim 1, wherein the destination is represented by an E.164 telephone number.

9. The method as defined in claim 1, wherein the first uniform resource identifier is a session initiation protocol uniform resource identifier, and the second uniform resource identifier is a hyper-text transfer protocol uniform resource identifier.

10. A method comprising:
   receiving a telephone number query request message for a destination at a telephone number server;
   identifying a first uniform resource identifier associated with the destination at the telephone number server, the first uniform resource identifier useable to establish a first communication session to the destination;
   identifying a second uniform resource identifier associated with the destination at the telephone number server, the second uniform resource identifier to address a server associated with the destination to provide content associated with the first communication session via a second communication session; and
   sending a query response message that includes the first uniform resource identifier, the second uniform resource identifier, and a third uniform resource identifier associated with a content mediator.

11. The method as defined in claim 10, wherein the query request message comprises an E.164 telephone number associated with the destination.

12. The method as defined in claim 10, wherein the first communication session comprises an audio voice over Internet Protocol communication session, and the second communication session comprises a web-services communication session.

13. The method as defined in claim 10, wherein the second communication session comprises a hyper-text transfer protocol communication session.

14. A call session control function server, comprising:
   a processor; and
   a storage device comprising computer readable instructions which, when executed, cause the processor to perform operations comprising:
      performing a telephone number database query to obtain a first uniform resource identifier for a destination and to obtain a second uniform resource identifier for the destination;
      establishing a first communication session to the destination based on the first uniform resource identifier; and
      initiating a second communication session on behalf of a calling device to the destination based on the second uniform resource identifier, the destination to provide content associated with the first communication session via the second communication session.

15. The call session control function server as defined in claim 14, wherein the second communication session is used to obtain content selected at the destination via the first communication session.

16. The call session control function server as defined in claim 14, wherein the first communication session is established by sending a session initiation protocol INVITE message to the first uniform resource identifier.

17. The call session control function server as defined in claim 14, wherein the second communication session is initiated by sending a session initiation protocol NOTIFY message to a content mediation platform, the NOTIFY message including the second uniform resource identifier.

18. The call session control function server as defined in claim 17, wherein the session initiation protocol NOTIFY message comprises a call dialog parameter to initiate the first communication session, the destination being based on the call dialog parameter to associate the first and second communication sessions.

19. The call session control function server as defined in claim 14, wherein the first communication session is directed to a first server at the destination, and the second communication session is directed to a second server at the destination.

20. The call session control function server as defined in claim 19, wherein the second server is to provide web based content based on the first communication session.

21. The call session control function server as defined in claim 14, wherein the destination is represented by an E.164 telephone number.

22. The call session control function server as defined in claim 14, wherein the first uniform resource identifier is a session initiation protocol uniform resource identifier, and the second uniform resource identifier is a hyper-text transfer protocol uniform resource identifier.

23. A content server, comprising:
   a processor; and
   a storage device comprising computer readable instructions which, when executed, cause the processor to perform operations comprising:
      accessing a telephone number query request message for a destination at a telephone number server;
      identifying a first uniform resource identifier associated with the destination at the telephone number server, the first uniform resource identifier useable to establish a first communication session to the destination;
      identifying a second uniform resource identifier associated with the destination at the telephone number server, the second uniform resource identifier to address a processor associated with the destination to provide content associated with the first communication session via a second communication session; and
      sending a query response message that includes the first uniform resource identifier, the second uniform resource identifier, and a third uniform resource identifier associated with a content mediator.

24. The content server as defined in claim 23, wherein the query request message comprises an E.164 telephone number associated with the destination.

25. The content server as defined in claim 23, wherein the first communication session comprises an audio voice over Internet Protocol communication session, and the second communication session comprises a web-services communication session.

26. The content server as defined in claim 23, wherein the second communication session comprises a hyper-text transfer protocol communication session.

27. The method as defined in claim 1, wherein initiating the second communication session enables the calling device to simultaneously participate in the first communication session and present the content obtained via the second communication session.

28. The method as defined in claim 10, wherein the third uniform resource identifier is associated with the content mediator, and the content mediator is to establish the second communication session in response to being notified of call-associated content for the first communication session.

* * * * *